(12) United States Patent
Casters

(10) Patent No.: US 9,525,570 B2
(45) Date of Patent: Dec. 20, 2016

(54) CURRENT SENSING CIRCUITRY AND INTEGRATED CIRCUIT AND METHOD FOR SENSING A CURRENT

(75) Inventor: Jerome Casters, Toulouse (FR)

(73) Assignee: NXP USA, Inc., Austin, TX (US)

( * ) Notice: Subject to any disclaimer, the term of this patent is extended or adjusted under 35 U.S.C. 154(b) by 1322 days.

(21) Appl. No.: 13/130,187

(22) PCT Filed: Jan. 5, 2009

(86) PCT No.: PCT/IB2009/051968
§ 371 (c)(1),
(2), (4) Date: May 19, 2011

(87) PCT Pub. No.: WO2010/076671
PCT Pub. Date: Jul. 8, 2010

(65) Prior Publication Data
US 2011/0227591 A1    Sep. 22, 2011

(51) Int. Cl.
G01R 27/08 (2006.01)
H04L 25/02 (2006.01)

(52) U.S. Cl.
CPC .................... *H04L 25/0282* (2013.01)

(58) Field of Classification Search
CPC .................................................. H04L 25/0282
USPC ........................................................ 324/705
See application file for complete search history.

(56) References Cited

U.S. PATENT DOCUMENTS

| 4,303,871 | A | * | 12/1981 | Berry ..................... H02P 8/12 |
| | | | | 318/400.13 |
| 5,150,121 | A | * | 9/1992 | Newell et al. ............ 341/157 |
| 5,555,263 | A | | 9/1996 | Fong et al. |
| 6,114,876 | A | * | 9/2000 | Kwong et al. ............... 326/81 |
| 6,317,069 | B1 | * | 11/2001 | Male et al. ................ 341/154 |
| 7,336,085 | B2 | | 2/2008 | Fabbro et al. |
| 8,704,609 | B2 | * | 4/2014 | Kuroda .................. 333/24 R |
| 2002/0196004 | A1 | | 12/2002 | Berson et al. |
| 2003/0218455 | A1 | | 11/2003 | Tai et al. |
| 2004/0008270 | A1 | * | 1/2004 | Hisamatsu et al. ........ 348/257 |

(Continued)

FOREIGN PATENT DOCUMENTS

EP          1524567 A        4/2005

OTHER PUBLICATIONS

Huang, et al., Low-ripple and dual-phase charge pump circuit regulated by switched capacitor based bandgap reference, IEEE Trans on Power Electronics, vol. 24, No. 5, May 2009 p. 1161-1173.*

(Continued)

*Primary Examiner* — Thomas Valone
(74) *Attorney, Agent, or Firm* — Charlene R. Jacobsen

(57) ABSTRACT

Current sensing circuitry for sensing a current through a load comprises an adaptive-resistance sensor component arranged to be operably coupled in series with the load, and control logic for controlling a resistance of the adaptive-resistance sensor component. The control logic is arranged to receive a signal representative of a voltage across the adaptive-resistance sensor component, compare the received signal to a reference value that is representative of a determined voltage, and in response to the comparison control the resistance of the adaptive-resistance sensor component, such that the voltage across the adaptive-resistance sensor component substantially tracks the determined voltage value.

17 Claims, 8 Drawing Sheets

(56) References Cited

U.S. PATENT DOCUMENTS

2006/0187099 A1* 8/2006 Fujimoto .............. H03M 3/366
                                                            341/143
2007/0057654 A1   3/2007 Lee
2009/0303785 A1* 12/2009 Hwang et al. ................ 365/163
2011/0006794 A1*  1/2011 Sellathamby et al. ... 324/754.03

OTHER PUBLICATIONS

Richard, et al., High voltage charge pump using standard CMOS technology, 07803-8322-2/04/, 2004, p. 1-4.*
International Search Report and Written Opinion correlating to PCT/IB2009/051968 date Oct. 27, 2009.

* cited by examiner

CURRENT SENSING CIRCUITRY AND INTEGRATED CIRCUIT AND METHOD FOR SENSING A CURRENT

FIELD OF THE INVENTION

The field of this invention relates to current sensing circuitry, and in particular to current sensing circuitry for sensing a current through a load and an integrated circuit, electronic device and a method therefor.

BACKGROUND OF THE INVENTION

In the field of electronic devices, it is often necessary for a current to be measured, for example in order to ensure that a sufficient current is provided to a load. Power over Ethernet (PoE) is an example of where a minimum current is required to be provided over an Ethernet connection. PoE is a system for transferring electrical power, along with data, to remote devices over, for example, a standard twisted pair cable in an Ethernet network. Such a system is useful for power IP (Internet Protocol) telephones, wireless LAN (Local Area Network) access points, network cameras, etc. There are several PoE implementations, including many ad-hoc techniques. However, the most common implementation of PoE is that defined in IEEE 802.3af. As will be appreciated, a load as perceived by a PoE driver will vary depending on, for example, the remote device(s) connected thereto, as well as the length of cable, etc. Accordingly, PoE drivers are required to be able to adapt to the varying loads that they might encounter in order to ensure that a sufficient current is provided.

PoE drivers are typically 'low side' (i.e. operably coupled between a load and ground), and are typically required to convey a current ranging from, say, 5 mA up to 1 A to a remote device. Existing approaches for ensuring that a sufficient current is being provided are typically based on the use of a series sense resistor, whereby the voltage across the sense resistor provides an indication as to the current flowing there through. The output of a PoE driver may then be adjusted in response to the voltage monitored across the sense resistor in order to ensure that the required current is flowing.

The value of the sense resistor is initially selected based on a trade-off between accuracy and power dissipation; the higher the value of the sense resistor the greater the accuracy that can be achieved, but also the greater the power dissipation, and vice versa. For example, take the case where a 5 mA current is to be measured with 10% accuracy. A 1 Ohm sense resistor will result in a sense voltage of 5 mV, making a 10% accuracy (500 µV) achievable with trimmed detectors. However, the sense resistor will dissipate 1 W of power with a 1 A current, which would be duplicated for each port. Clearly such high power dissipation is undesirable. A 0.2 Ohm sense resistor would result in only a 200 mW power dissipation with a 1 A current. However, a 0.2 Ohm sense resistor would result in only a 1 mV sense voltage with a 5 mA current, requiring a 10% accuracy corresponding to a 100 µV precision which is difficult to achieve.

SUMMARY OF THE INVENTION

The present invention provides current sensing circuitry, an integrated circuit (IC), and electronic device and a method of sensing a current as described in the accompanying claims.

Specific examples of the invention are set forth in the dependent claims.

These and other aspects of the invention will be apparent from and elucidated with reference to the examples described hereinafter.

BRIEF DESCRIPTION OF THE DRAWINGS

Further details, aspects and examples of the invention will be described, by way of example only, with reference to the drawings. Elements in the figures are illustrated for simplicity and clarity and have not necessarily been drawn to scale.

DETAILED DESCRIPTION

Examples of the invention will now be described in terms of an example of current sensing circuitry adapted for use with a Power over Ethernet (PoE) driver or the like. However, it will be appreciated that the examples herein described are not limited to PoE applications, and may be implemented within any other suitable application in which a current is required to be measured.

Figure 1:
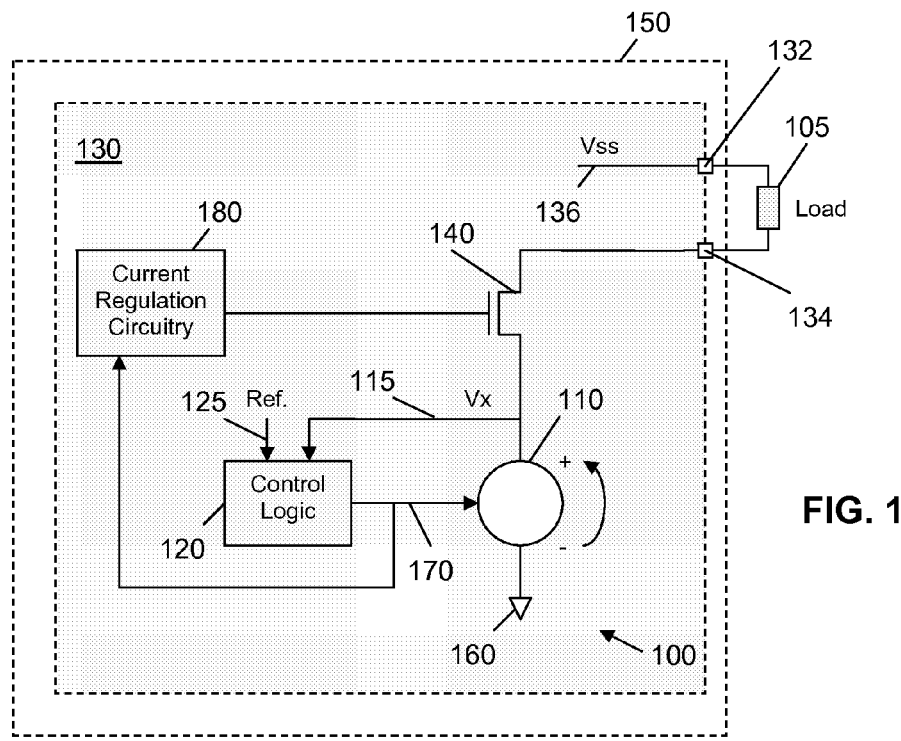
FIG. 1 illustrates an example of current sensing circuitry.

Referring now to FIG. 1, there is illustrated an example of current sensing circuitry 100 for sensing a current through a load 105. In particular, for the illustrated example, the current sensing circuitry 100 is located on an integrated circuit (IC) 130, for example forming part of an electronic device 150. The load 105, which for the illustrated example is located substantially external to the electronic device 150, is operably coupled between a first pin 132 of the IC 130 and a second pin 134 of the IC 130. The first pin 132 of the IC 130 is operably coupled to a supply voltage Vss 136. A power transistor (M0) 140 is operably coupled between the second pin 134 of the IC 130 and a ground plane 160.

The current sensing circuitry 100 comprises an adaptive-resistance sensor component 110 arranged to be operably coupled in series with the load 105. In particular for the illustrated example, the adaptive-resistance sensor component 110 is arranged to be operably coupled in series with the load 105 between the power transistor 140 and the ground plane 160. The current sensing circuitry 100 further comprises control logic 120 for controlling a resistance of the adaptive-resistance sensor component 110. The control logic 120 is arranged to receive a signal that is representative of a voltage 115 across the adaptive-resistance sensor component 110, compare the received signal that is representative of the voltage 115 across the adaptive-resistance sensor component 110 to a reference value 125 representative of a determined voltage value, and to control the resistance of the adaptive-resistance sensor component 110 in response to the comparison. The resistance value is controlled, such that the voltage 115 across the adaptive-resistance sensor component 110 substantially tracks the determined voltage value.

By setting the determined voltage value that the voltage 115 across the adaptive-resistance sensor component is to track, to say, a region of 50 mV, a sensing accuracy of 10% requires the control logic 120 to comprise a minimum sensing resolution of 5 mV. Advantageously, such a sensing resolution is easily achievable, irrespective of the current flow. Furthermore, for a high current flow of, say 1 A, the power dissipation resulting from the current flowing through the adaptive-resistance sensor component 110 will only be 50 mW. Thus, the current sensing circuitry 100 is capable of sensing a current flowing through a load with 10% accuracy, whilst only dissipating 50 mW of power with a 1 A current.

This is a significant improvement over the prior art techniques, which typically result in a 1 W power dissipation with a 1 A current when using a 1 Ohm sense resistor. Even in the case where the prior art technique uses a 0.2 Ohm sense resistor, requiring a difficult to achieve 100 μV precision in order to achieve a 10% accuracy, the power dissipation for a 1 A current is 200 mW, four times that for the circuit described in the above example.

Figure 2:
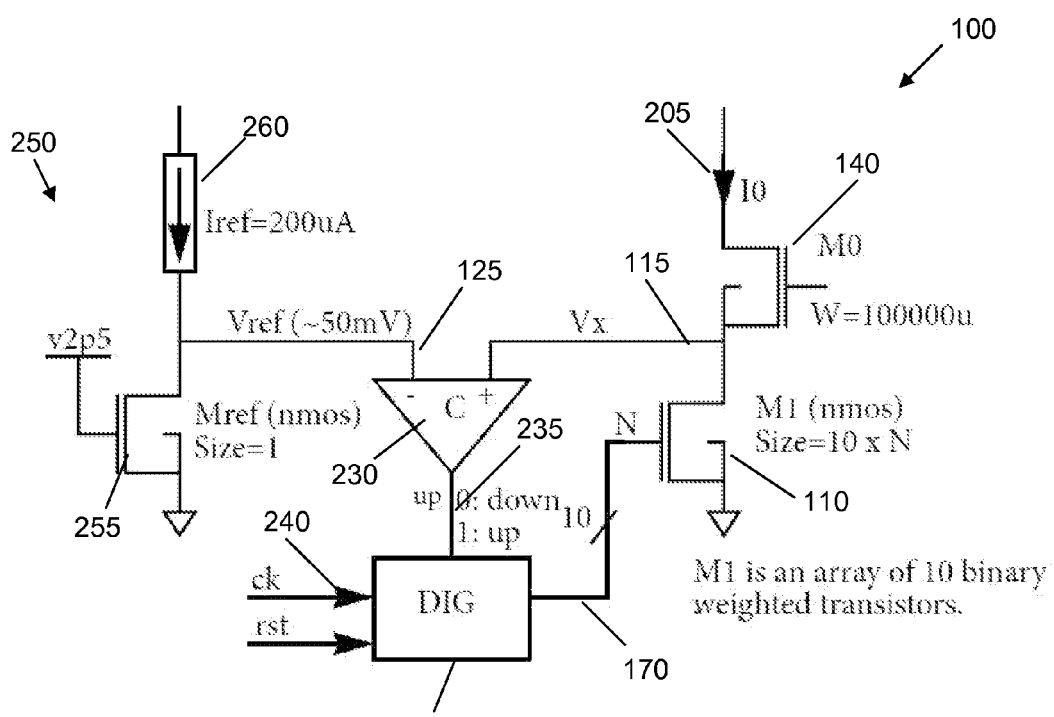
FIG. 2 illustrates an example of the current sensing circuitry of FIG. 1 in greater detail.

Referring now to FIG. 2, there is illustrated a further example of the current sensing circuitry 100. For this illustrated example, the adaptive-resistance sensor component 110 comprises an array of ten low voltage (LV) binary weighted transistors, the binary weighted transistors having their drains connected together. The sources of the binary weighted transistors are also connected together such that the binary weighted transistors are operably coupled in parallel. In this manner, the conductances of the individual binary weighted transistors add up to provide the overall conductance of the adaptive-resistance sensor component 110. The gates of the binary weighted transistors are controlled separately, and in particular are controlled by way of a control signal 170. The binary weighted transistors may comprise high density MOSFETs (Metal Oxide Semiconductor Field Effect Transistors), such as those typically used within a digital core. The control logic 120 comprises an up-down counter 220, the up-down counter 220 comprising as an output the control signal 170 for controlling the resistance of the adaptive-resistance sensor component 110. The control logic 120 further comprises comparator logic 230 arranged to compare the received signal that is representative of the voltage 115 across the adaptive-resistance sensor component 110 to the reference value 125, which for the illustrated example is in the form of a reference voltage value representative of the determined voltage value to be tracked, and to provide an indication 235 to the up-down counter 220 as to whether the received signal is less than or greater than the reference value 125.

For the example illustrated in FIG. 2, the up-down counter 220 is arranged to count up if the received signal representative of the voltage 115 across the adaptive-resistance sensor component 110 is greater than the reference value 125, and count down if the received signal representative of the voltage 115 across the adaptive-resistance sensor component 110 is less than the reference value. The up-down counter is then arranged to output its value over the control signal 170, in order to control the resistance of the adaptive-resistance sensor component such that the voltage 115 across the adaptive-resistance sensor component 110 will tend to oscillate about the determined voltage value represented by the reference value 125, and in this manner substantially track the determined voltage value. The amplitude of these oscillations, and thereby the accuracy with which the voltage 115 across the adaptive-resistance sensor component 110 tracks the determined voltage value, is in general dependent upon the step size of the control signal 170, and the relationship between the control signal 170 and the resistance of adaptive-resistance sensor component 110. In the particular example, the up-down counter 220 comprises a 10-bit up-down counter arranged to digitally control the gates of the ten LV binary weighted transistors by way of a 10-bit control signal.

For example, as mentioned above, the ten LV binary weighted transistors may be connected in parallel, with their sources connected together, their drains connected together, and their gates controlled separately by way of the control signal 170. The ten LV binary weighted transistors may be numbered, for example from $M1_0$ through to $M1_3$, with for example the gate of transistor $M1_0$ being controllable by way of the least significant bit (LSB) of the control signal 170, and $M1_0$ being controllable by way of the most significant bit (MSB) of the control signal 170. $M1_0$ may comprise a single unit size, with each subsequent transistor in the array being substantially twice the size of its preceding neighbour. Thus, in this manner, $M1_1$ may comprise a unit size of two, $M1_2$ may comprise a unit size of four, $M1_3$ may comprise a unit size of eight, and so on through to $M1_3$ having a unit size of 512. The gate of each transistor may be controllable by way of its corresponding bit within the 10-bit control signal, and may be either 'on' or 'off'. As such, the ten LV binary weighted transistors are capable of 1024 possible configurations, with each configuration corresponding to a different combined conductance of the array of transistors.

The low voltage (LV) binary weighted transistors of the adaptive-resistance sensor component 110 may be sized such that the voltage across their drain and source terminals (Vds) is typically around 50 mV at the maximal current. For PoE applications, where the maximal current is 1 A, this leads to a 50 Ohm typical 'on' internal resistance (Rdson). Typically, such transistors may comprise an area of around 0.025 mm². It is worth noting that a typical power transistor that may be used for the power transistor (M0) 140, may comprise an area of around 0.6 mm². This difference in area is due to the fact that the Rdson density ratio between the power transistor 140, and the adaptive-resistance sensor components 110, is approximately 115:1.

Figure 3:
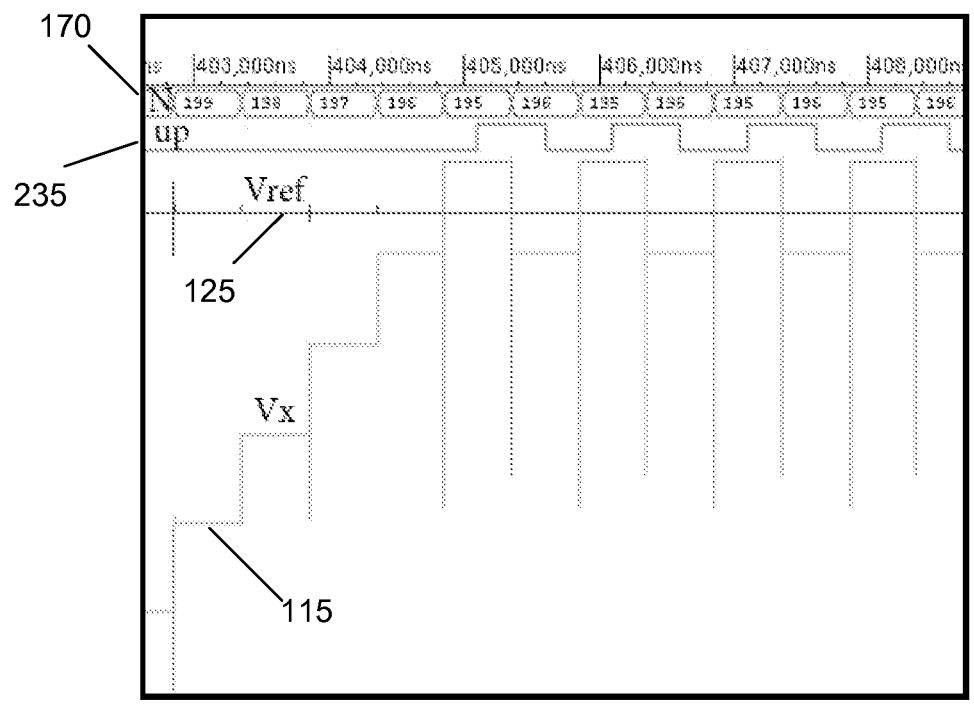
FIG. 3 illustrates an example of part of a plot for a catch up transient for the current sensing circuitry of FIG. 2.

FIG. 3 illustrates an example of part of a plot for a catch-up transient of the voltage 115 across the adaptive-resistance sensor component 110 of FIG. 1, for example after power up of the electronic device 150. For the example illustrated in FIG. 3, upon initialisation (for example after power up), the control logic 120 is arranged to turn the adaptive-resistance sensor component 110 fully 'on' such that the resistance of the adaptive-resistance sensor component 110 is low. As a result, the voltage 115 across the adaptive-resistance sensor component 110 will also be low, the actual value for the voltage 115 being further dependent upon the load current 205 (FIG. 2) flowing there through.

In accordance with the illustrated example, upon initialisation, the up-down counter 220 (and thereby the control signal 170) is set to a hexadecimal value of 3 FFh (equivalent to a decimal value of 1023d) such that all ten of the LV binary weighted transistors of the adaptive-resistance sensor component 110 are fully 'on'. Accordingly (assuming that the load current 205 is not so high that even when all ten of the LV binary weighted transistors of the adaptive-resistance sensor component 110 are fully 'on' the voltage 115 across the adaptive-resistance sensor component 110 is greater than the reference voltage value 125) the initial low resistance of the adaptive-resistance sensor component 110 will result in the voltage 115 being less than the reference voltage value 125. The comparator logic 230 compares the received signal that is representative of the voltage 115 across the adaptive-resistance sensor component 110 to the reference value 125, and indicates 235 to the up-down counter 220 that the voltage 115 is less than the reference value 125.

For the illustrated example, the up-down counter 220 is arranged to increment the control signal 170 by 'one' if the received signal that is representative of the voltage 115 across the adaptive-resistance sensor component 110 is greater than the reference value 125. Similarly, the up-down counter 220 is arranged to decrement the control signal 170 by 'one' if the received signal that is representative of the voltage 115 is less than the reference value 125. As a result, upon receipt of the indication 235 that the voltage 115 across the adaptive-resistance sensor component 110 is less than the reference value 125, the up-down counter 220 decrements the control signal 170 by 'one'.

Decrementing the control signal 170 by 'one' results in the resistance of the adaptive-resistance sensor component 110 being increased, which in turn causes the voltage 115 across the adaptive-resistance sensor component 110 to increase. In this manner, the voltage 115 across the adaptive-resistance sensor component 110 may be incrementally increased in a step wise manner until it exceeds the reference voltage value 125.

Once the voltage 115 across the adaptive-resistance sensor component 110 exceeds the reference voltage value 125, the comparator logic 230 indicates 235 to the up-down counter 220 that the voltage 115 across the adaptive-resistance sensor component 110 is greater than the reference value 125. Upon receipt of the indication 235 that the voltage 115 is greater than the reference value 125, the up-down counter 220 increments the control signal 170 by 'one', causing the resistance of the adaptive-resistance sensor component 110 to decrease, which in turn causes the voltage 115 across the adaptive-resistance sensor component 110 to decrease.

This decrease in the voltage 115 across the adaptive-resistance sensor component 110 causes the voltage 115 across the adaptive-resistance sensor component 110 to drop below the reference value 125. As a result the up-down counter 220 will subsequently decrement the control signal 170 in order to increase the resistance of the adaptive-resistance sensor component 110, in order to once again increase the voltage 115 across the adaptive-resistance sensor component 110.

In accordance with further examples, the comparator logic 230 may comprise a synchronous comparator. In this manner, the comparator logic 230 may be arranged to perform a comparison of the received signal that is representative of the voltage 115 to the reference value 125, and to provide an indication 235 to the up-down counter 220 as to whether the received signal is less than or greater than the reference value 125, on one of a positive edge or a negative edge of a clock signal 240. It is further contemplated that the up-down counter 220 may be arranged to count up or count down, depending on the received indication 235, on the other of the positive edge or negative edge of the clock signal 240. For example, the comparator logic 230 may be arranged to perform the comparison and provide the indication 235 to the up-down counter 220 on the positive edge of the clock signal 240, and the up-down counter 220 may be arranged to count up or count down on the negative edge of the clock signal 240.

Referring back to FIG. 1, the control signal 170 that is output by the control logic 120 not only enables the resistance of the adaptive-resistance sensor component 110 to be controlled, but also provides an indication of the resistance of the adaptive-resistance sensor component 110. Accordingly, assuming the voltage 115 across the adaptive-resistance sensor component 110 is substantially tracking the determined voltage value, the control signal 170 may be used to provide an indication of the current flowing through the adaptive-resistance sensor component 110, and thus the current flowing through the load 105. Thus, for the illustrated example of FIG. 1, the control signal 170 is operably coupled to current regulation circuitry 180, which receives the control signal 170, comprising the value of the up-down counter 220 for the example illustrated in FIG. 2, and from this value is able to determine an estimate of the measured current flowing through the load. The current regulation circuitry 180 is operably coupled to the power transistor 140, and in this manner is able to regulate the current flowing through the load, based on the control signal 170 via the power transistor 140. An example of current regulation circuitry 180 will be described in more detail below with reference to FIG. 7.

Referring back to FIG. 2, for this example, the current sensing circuitry 100 comprises reference circuitry 250 for generating a reference voltage (Vref) for use as the reference value 125. The reference circuitry 250 comprises a reference transistor 255 and a charge pump 260 that is operably coupled to the reference transistor 255 such that current (Iref) from the charge pump 260 flows through the reference transistor 255. An internal resistance of the reference transistor 255 causes a voltage drop across the reference transistor 255, said voltage drop across the reference transistor 255 providing the reference voltage (Vref) for use as the reference value 125. In this manner, the reference voltage (Vref) may be set to substantially match the determined voltage value that the voltage 115 across the adaptive-resistance sensor component 110 is to substantially track.

Assuming that the current sensing circuitry 100 does not comprise quantization noise, gain error caused by the difference between the reference voltage Vref 125 and the voltage Vx 115 across the adaptive-resistance sensor component 110 is only dependent on an offset (Voff) of the comparator at the equilibrium such that:

$$Vref = Vx + Voff \quad [1]$$

which can be re-written in terms of current 'I' and conductance 'Y' for Vref and Vx as follows:

$$\frac{Iref}{Yref} = \frac{I0(N)}{Y(N)} + Voff \quad [2]$$

where:
Yref is the conductance of the reference transistor 255, and
I0(N) and Y0(N) represent the current flowing through, and conductance of, the adaptive-resistance sensor component 110 respectively.

The output current can then be given by:

$$I0(N) = Iref \cdot \frac{Y(N)}{Yref} - Y(N) \cdot Voff \quad \ldots \quad [3]$$

$$\Rightarrow I0(N) = \frac{Y(N)}{Yref} \cdot (Iref - Voff \cdot Yref) \quad [4]$$

Since Y(0)=0 (although in practice Y(N=0) never occurs since the array is never fully 'OFF'), the system does not have offset error by construction. Thus, the gain error stems from the terms Y(N) and (Vref–Voff), such that:

$$\frac{\Delta I0}{I0} = \frac{\Delta\left(\frac{Y(N)}{Yref}\right)}{\left(\frac{Y(N)}{Yref}\right)} + \frac{\Delta Iref}{Iref} + \frac{\Delta Voff \cdot Yref}{Iref} \quad \ldots \quad [5]$$

$$\Rightarrow \frac{\Delta I0}{I0} = \frac{\Delta\left(\frac{Y(N)}{Yref}\right)}{\left(\frac{Y(N)}{Yref}\right)} + \frac{\Delta Iref}{Iref} + \frac{\Delta Voff}{Vref} \quad [6]$$

The gain error on the current measurement stems from three components:

The error linked to the mismatch between the reference transistor 255 and the adaptive-resistance sensor component 110 (a simulation with a small reference transistor (w=1.995 um, l=0.28 um, ng=2) provides a standard deviation of 0.7%. In contrast, whilst using a larger reference transistor would improve the matching performance, it would necessitate a larger current reference to maintain the drain at, say, 50 mV);

(ii) The relative error on the reference current (Iref), largely dependent on the trimming strategy and how the reference current is generated (error range: 1%-10%); and (iii) The comparator offset error relative to Vref (error range: 2%-10%).

Figure 4:
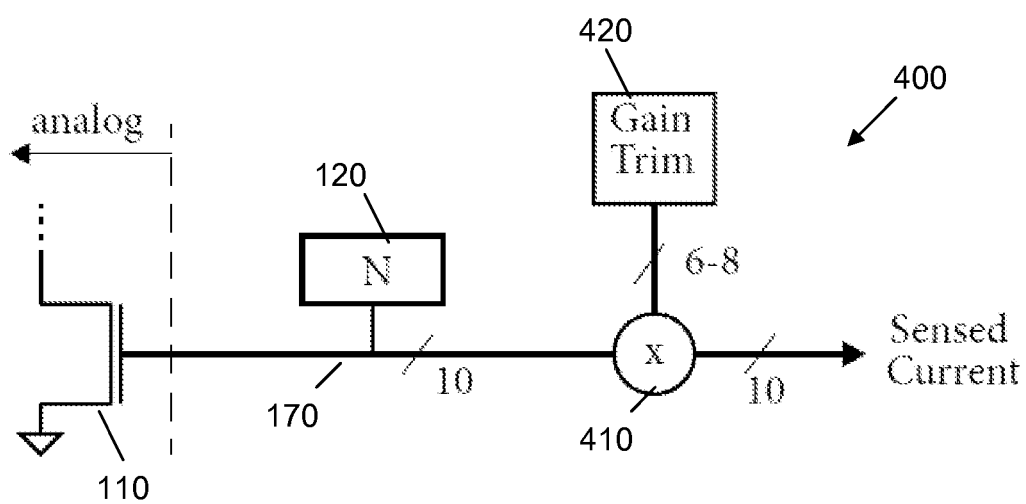
FIG. 4 illustrates an example of gain error compensation logic.

The total error can thus be in the order of 20%, which may need to be compensated for. FIG. 4 illustrates an example of gain error compensation logic 400. The gain error compensation logic 400 may be operably coupled between the control logic 120 and, say, the current regulation circuitry 180 (of FIG. 1), and comprises a multiplier 410 for digitally compensating the control signal 170 using a gain trim value 420. Thus, in this manner, the matching between the reference voltage Vref 125 and the voltage Vx 115 across the adaptive-resistance sensor component 110 may be kept to within a few percent.

Figure 5:
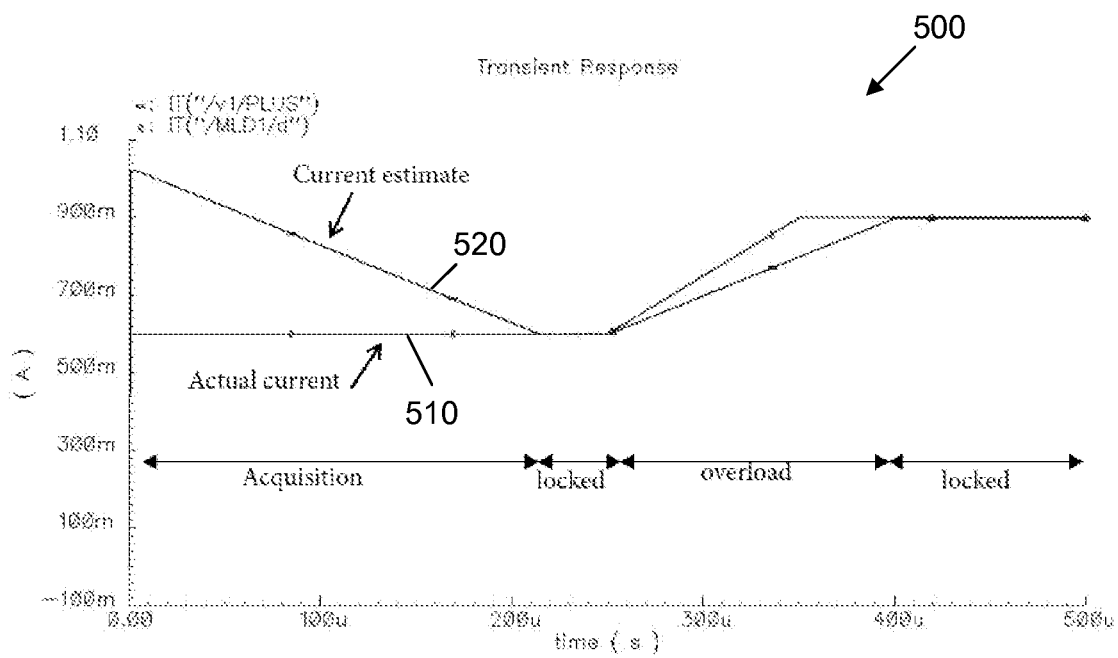
FIG. 5 illustrates an example of part of a plot showing the transient response for the current sensing circuitry of FIG. 2.

Referring now to FIG. 5, there is illustrated an example of part of a plot 500 showing the transient response for the current sensing circuitry 100 of FIG. 1. As previously mentioned, the up-down counter 220 is arranged to increment the control signal 170 if the received signal that is representative of the voltage 115 across the adaptive-resistance sensor component 110 is greater than the reference value 125, and to decrement the control signal 170 if the received signal is less than the reference value 125. For the transient response illustrated in FIG. 5, the control logic 120 comprises a simple up-down counter 220 arranged to increment or decrement, as required, the control signal 170 by 'one' each time.

As illustrated in FIG. 5, at power up the up-down counter 220 is set to 1023d, and the actual current 510 is 600 mA.

It takes 212 μs for the up-down counter 220 to decrement its value down to the appropriate value for the current estimate 520 to substantially match the actual current 510. At 350 μs, the actual current follows a slope 515 of 3 mA/μs for 100 μs. Because the rate of change of the actual current 510 is faster than that which the simple up-down counter 220 is capable of following, the current estimate 520 fails to follow precisely the actual current 510, resulting in a delay of 150 μs before the current estimate 520 reaches the new value of the actual current 510.

Figure 6:
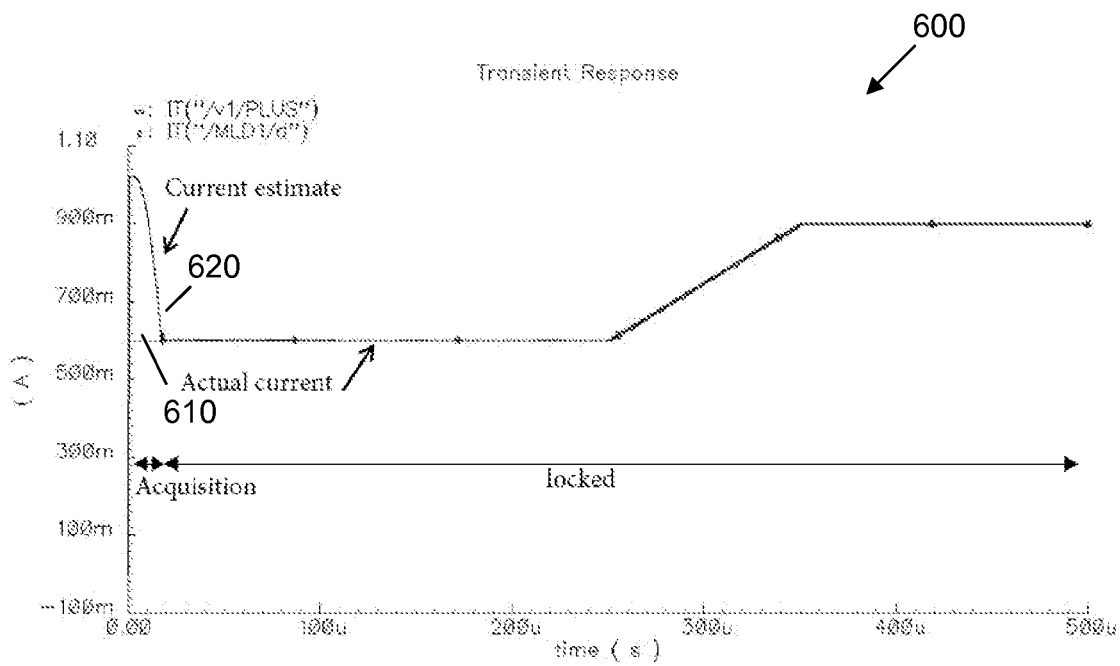
FIG. 6 illustrates a further example of part of a plot showing the transient response with adaptive control for the current sensing circuitry of FIG. 2.

Referring now to FIG. 6, there is illustrated an example of part of a plot 600 showing the transient response with adaptive control for the current sensing circuitry 100. For the transient response illustrated in FIG. 6, the control logic 120 comprises an adaptive step size up-down counter 220 of FIG. 2. For example, the adaptive step size up-down counter 220 of FIG. 2 may be arranged to set the initial step size to '1' such that the up-down counter 220 increments and/or decrements its value by 'one' each time, in a similar manner to the simple up-down counter of the transient response of FIG. 5. However, the adaptive step size up-down counter 220 for FIG. 6 may further be arranged to increase the step size if the counter increases or decreases its value in the same direction more than a determined number of times. For example, if the up-down counter 220 increases or decreases its value three times consecutively in the same direction, the up-down counter 220 may increment the step size with which it increases or decreases its value. If the up-down counter 220 subsequently increases or decreases its value in the opposite direction, it may then reduce, for example halve, the step size with which it increases or decreases its value.

As can be seen from the transient response illustrated in FIG. 6, at power up the adaptive step size up-down counter takes only 17 μs to decrement its value down to the appropriate value for the current estimate 620 to substantially match the actual current value 610, as opposed to the 212 μs it took the simple up-down counter of FIG. 5. Furthermore, the adaptive step size up-down counter of FIG. 6 is able to substantially match the rate of change of the actual current value when, at 350 μs, the actual current follows a slope 515 of 3 mA/μs for 100 μs, such that the current estimate 620 remains substantially locked to the actual current 610.

Figure 7:
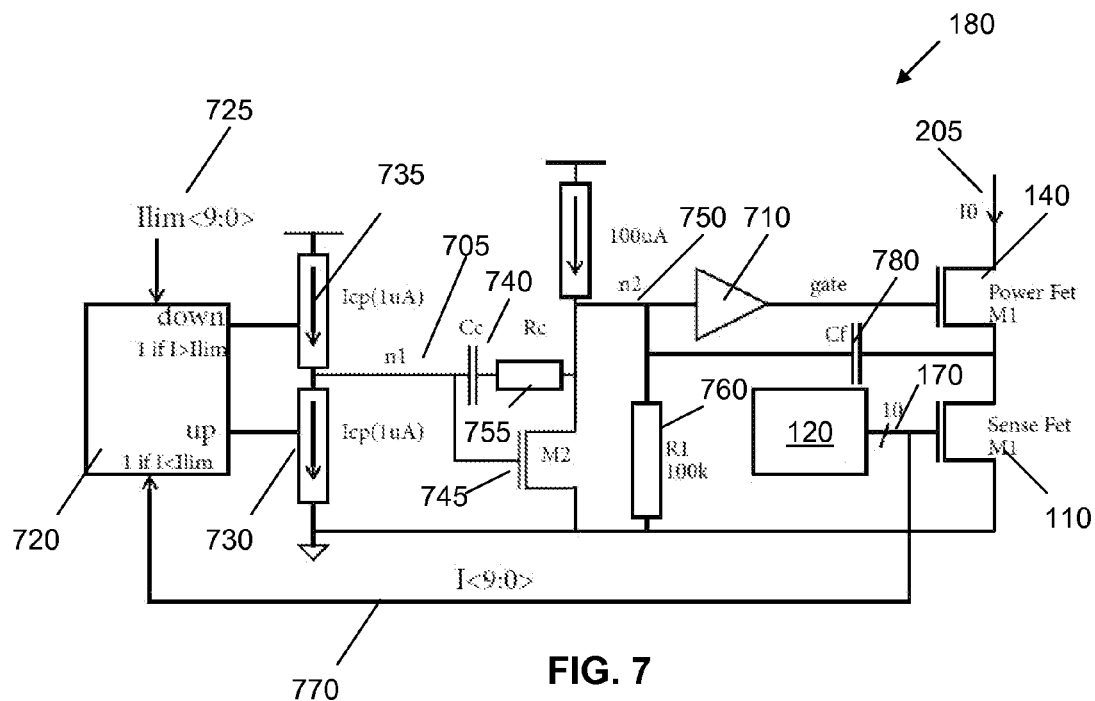
FIG. 7 illustrates an example of current regulation circuitry.

Referring now to FIG. 7, there is illustrated an example of the current regulation circuitry 180 of FIG. 1. For the illustrated example, the current regulation circuitry 180 and current sensing circuitry 100 are adapted for use within a PoE application. In PoE applications, typically both the output current and the output voltage are controllable. In the case of the voltage regulation, the dominant pole is typically external to the IC, whilst for current regulation the dominant pole is typically internal to the IC. For current regulation, the dominant pole cannot be located on the gate of the power transistor 140 since it is in the voltage control loop. Therefore, the internal dominant pole for the current regulation is located on a separate node, n1 705 for the current regulation circuitry 180 of FIG. 7, and the power transistor gate is driven by a low output impedance buffer 710.

As previously mentioned, the control signal 170 from the control logic 120 is operably coupled to current regulation circuitry 180, which receives the control signal and from this control signal is able to determine an estimate of the measured current flowing through the load. In particular for the illustrated example, the measured current estimate is in a form of a 10-bit vector I<9:0> 770. This measured current estimate 770 is received by charge pump controller 720, which compares the measured current estimate to a current limit value, which for the illustrated example is also in the form of a 10-bit vector Ilim<9:0>725. The charge pump controller 720 is arranged, upon the measured current estimate 770 being less than the current limit value 725, to turn 'on' a first charge pump 730 whilst turning 'off' a second charge pump 735. Conversely, the charge pump controller 720 is further arranged, upon the measured current estimate 770 being greater than the current limit value 725, to turn 'on' the second charge pump 735 whilst turning 'off' the first charge pump 730. If the measured current estimate 770 is substantially equal to the current limit value 725, the charge pump controller 720 is arranged to turn 'off' both charge pumps 730, 735.

In this manner, when the measured current estimate 770 is less than the current limit value 725, thereby indicating that the load current I0 205 is too low, the first charge pump 730 draws current away from node n1 705 (the dominant pole), and thus away from capacitor Cc 740. Tahe voltage at node n1 705 decreases as current is pulled away from capacitor Cc 740. Once the voltage at node n1 705 is sufficiently low, transistor M2 745 turns 'off'. As a result, the voltage at node n2 750 increases. More specifically for the illustrated embodiment, when transistor M2 745 is turned 'off', a 100 μA current from charge pump 755 flows through 100 kOhm resistor 760, thereby increasing the voltage at n2 750 up to 10V. As previously mentioned, the gate voltage of the power transistor 140 is driven by a low impedance buffer 710, the input of which is operably coupled to n2 750. Thus, the output of the low impedance buffer 710 substantially mirrors the voltage at its input, thereby increasing the voltage at the gate of the power transistor 140. As a result, the load current I0 205 increases.

Conversely, when the measured current estimate 770 is greater than the current limit value 725, thereby indicating that the load current I0 205 is too high, the second charge pump 735 introduces current into node n1 705. As current flows into capacitor Cc 740, the voltage at node n1 705 increases. Once the voltage at node n1 705 is sufficiently high, transistor M2 745 turns on. As a result, the voltage at node n2 750 decreases, since current is able to flow through transistor M2 745. As a result, the output voltage of the low impedance buffer 710 drops, lowering the gate voltage of the power transistor 140, and thereby causing the load current I0 205 to decrease.

A feed forward resistor Rc 755 attenuates the charging and discharging of the capacitor Cc 740, thereby improving the transient step response of the current regulation circuitry 180. Furthermore, a capacitor Cf 780 coupled between the node n2 750 and the source terminal of the power transistor 140 helps to maintain a constant voltage across the gate and source terminals (Vgs) of the power transistor 140, making the load current I0 205 substantially independent of any change in the internal resistance (Rdson) of the power transistor 140.

Figure 8:
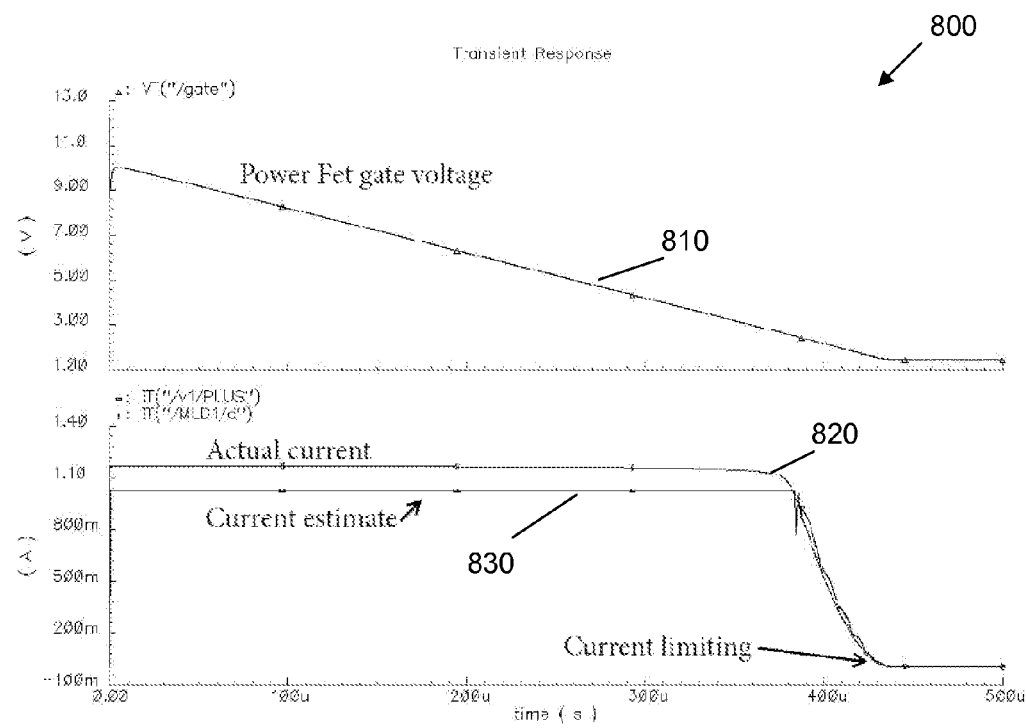
FIG. 8 illustrates an example of part of a plot for a transient response of the current regulation circuitry of FIG. 7.

Referring to FIG. 8, there is illustrated an example of part of a plot 800 for a transient response of the current regulation circuit 180 of FIG. 7. The plot illustrates the gate voltage 810 of the power transistor 140, the actual load current 820 and an estimated load current 830. At power up, the power transistor 140 is fully 'on', with the gate voltage 800 at 10V. As a result, the actual load current is at 1.2 A, which is out of the current sensor range. Accordingly, the load current is initially clamped at 1.2 A, with the current estimate at its maximum, which in terms of the 10-bit vector I<9:0> comprises a value of 1023d. The current limit value Ilim<9:0> is set to 5d, and so because the current estimate is higher than the current limit, the charge pump controller 720 causes the power transistor gate voltage to be discharged. After 350 μs, the gate voltage 810 drops sufficiently for the power transistor 140 to leave the linear region, and to start limiting the current. As can be seen, once the actual current 820 enters the current sensor range, the estimated load current 830 substantially tracks the actual current 820. Once the estimated current 830 drops sufficiently to substantially match the current limit, the charge pump controller 720 stabilises the actual current 820.

The current ripple at the output of the power transistor 140 is linked to the charge pump current (Icp) as a result of the first or second charge pump 730, 735, and to the capacitor Cc 740, through the following relationship:

$$\Delta I0 = gm0 \cdot R1 \cdot gm1 \cdot \Delta V(n1) \ldots \quad [7]$$

$$\Rightarrow \Delta I0 = \frac{gm0 \cdot R1 \cdot gm1 \cdot Icp \cdot \Delta T}{gm1 \cdot R1 \cdot c} \ldots \quad [8]$$

$$\Rightarrow \Delta I0 = \frac{gm0 \cdot Icp \cdot \Delta T}{C} \ldots \quad [9]$$

$$\Rightarrow \frac{\Delta I0}{I0} = \frac{2 \cdot Icp \cdot \Delta T}{C \cdot Veff(M0)} (StrongInv) - [\text{Equation 1}] \ldots \quad [10]$$

$$\Rightarrow \frac{\Delta I0}{I0} = \frac{Icp \cdot \Delta T}{Cc \cdot \frac{nkT}{q}} (WeakInv) - [\text{Equation 2}] \quad [11]$$

Equation 7 above is valid if the power transistor 140 is in strong inversion. If the power transistor 140 is biased at low current, the relative current ripple is given by Equation 8. The maximal relative ripple is obtained at low current when the power transistor 140 is biased in weak inversion. The values: Icp=1 μA; T=300K; ΔT=500 ns; n=3 and a target ripple amplitude of 5% leads to a capacitor value of approximately 60 pF, for example comprising a thin oxide capacitor.

Figure 9:
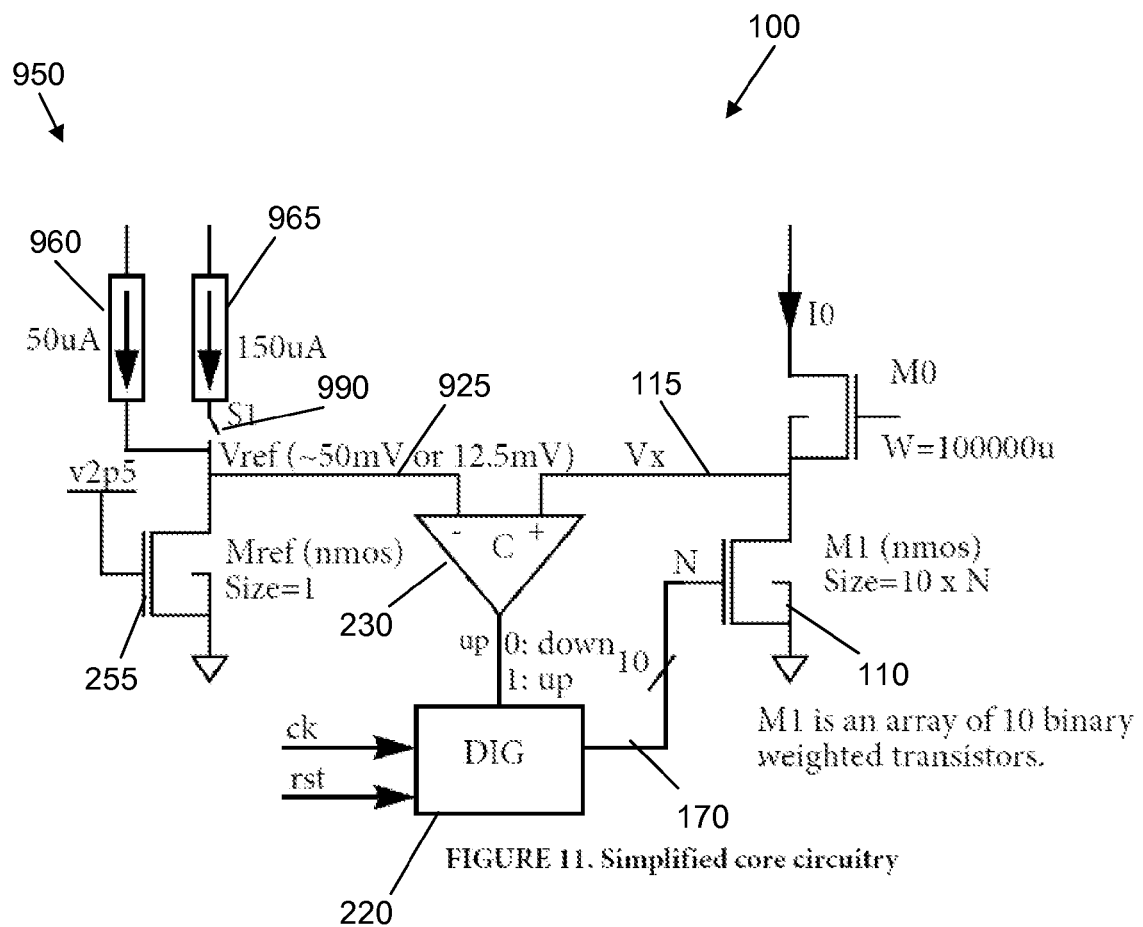
FIG. 9 illustrates an example of the current sensing circuitry of FIG. 1 in greater detail.

Referring now to FIG. 9, there is illustrated an alternative example of the current sensing circuitry 100 of FIG. 1. As mentioned above, the ten LV binary weighted transistors of the adaptive-resistance sensor component 110 are capable of 1024 possible configurations, with each configuration corresponding to a different combined conductance of the array of transistors. When the value of the control signal 170 is changed from, say 574 to 575, the conductance of the adaptive-resistance sensor component 110 varies by 1/574, which is approximately 0.17%, resulting in a 0.17% variation in the voltage Vx 115 across the adaptive-resistance sensor component 110. However, for the example illustrated in FIG. 2, the resolution decreases significantly at lower currents. For example, if the value of the control signal 170 is changed from 13 to 14, the conductance of the adaptive-resistance sensor component 110 varies by 1/13, which is approximately 7.7%, resulting in a 7.7% variation in the voltage Vx 115 across the adaptive-resistance sensor component 110.

For the example illustrated in FIG. 9, the current sensing circuitry 100 comprises reference circuitry 950 for generating a reference voltage (Vref) 925 for use as the reference value. In the same manner as for the reference circuitry 250 of FIG. 2, the reference circuitry 950 of FIG. 9 comprises reference transistor 255. The reference circuitry 950 of FIG. 9 further comprises a first charge pump 960 operably coupled to the reference transistor 255, such that current from the first charge pump 960 flows through the reference transistor 255. The reference circuitry 950 of FIG. 9 further comprises at least one further charge pump 965, the at least one further charge pump 965 being selectively coupled to the reference transistor 255.

In this manner, the at least one further charge pump 965 may be operably coupled, in parallel with the first charge pump 960, to the reference transistor 255 such that a combined current from the first charge pump 960 and the at least one further charge pump 965 flows through the reference transistor 255. Thus, for the illustrated example, when the at least one further charge pump 965 is operably coupled to the reference transistor 255, a 150 µA current from the at least one further charge pump 965 is combined with a 50 µA current from the first charge pump 960 thereby creating a combined reference current of 200 µA current that flows through the reference transistor 255. Conversely, the at least one further charge pump 965 may be substantially isolated from the reference transistor 255, for example by way of switching element 990. Accordingly, only the 50 µA reference current from the first charge pump 960 flows through the reference transistor 255.

The internal resistance of the reference transistor 255 causes a voltage drop across the reference transistor 255 that is proportional to the current flowing there through, said voltage drop across the reference transistor 255 providing the reference voltage (Vref) 925 for use as the reference value 125. For example, in the case where the reference transistor 225 is arranged to comprise an internal resistance of, say, 250 Ohm, the 200 µA combined reference current results in a reference voltage of 50 mV. Conversely, the 50 µA reference current from the first charge pump 960 alone results in a reference voltage of 12.5 mV.

Thus, by varying the reference current flowing through the reference transistor 255, the reference voltage 925 may be varied, thereby enabling the determined voltage value, which the voltage 115 across the adaptive-resistance sensor component 110 substantially tracks, to be varied. In this manner, the resolution with which the current flowing through the load may be measured can be varied (by a multiple of four for the example illustrated in FIG. 9). This ability to vary the resolution of the current measurement is particularly useful for measuring a low current.

Figure 10:
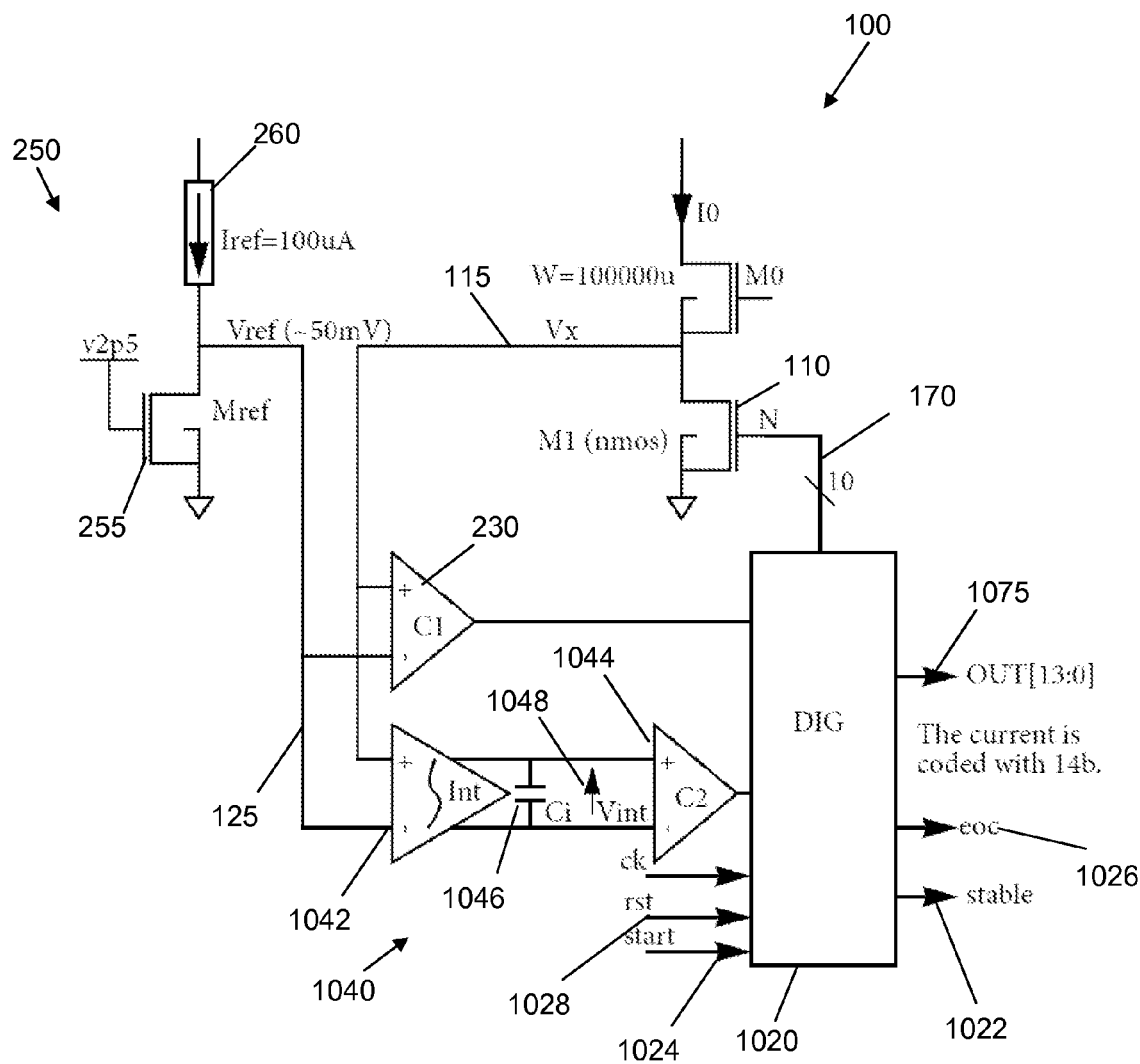
FIG. 10 illustrates an example of the current sensing circuitry of FIG. 1 in greater detail.

Referring now to FIG. 10, there is illustrated a further alternative example of the current sensing circuitry 100 of FIG. 1. The control logic 120 comprises an up-down counter 1020, the up-down counter 1020 comprising as an output the control signal 170 for controlling the resistance of the adaptive-resistance sensor component 110. The control logic 120 further comprises comparator logic 230 arranged to compare the received signal that is representative of the voltage 115 across the adaptive-resistance sensor component 110 to the reference value 125, and to provide an indication 235 to the up-down counter 1020 as to whether the received signal is less than or greater than the reference value 125.

Again, the up-down counter 1020 is arranged to count up if the received signal is greater than the reference value 125, and count down if the received signal is less than the reference value. The up-down counter 1020 then outputs its value over the control signal 170 to control the resistance of the adaptive-resistance sensor component such that the voltage across the adaptive-resistance sensor component 110 substantially tracks a determined voltage represented by the reference value 125.

For the example illustrated in FIG. 10, the control logic 120 further comprises integration circuitry 1040 arranged to integrate a difference between the received signal representation of the voltage 115 across the adaptive-resistance sensor component 110 and the reference value 125. The up-down counter 1020 is further arranged, whilst the voltage across the adaptive-resistance sensor component 110 is substantially tracking the determined voltage value, to initialise the integration circuitry 1040. In this manner the integration circuitry 1040 provides the up-down counter 1020 with an increased resolution for the difference between the received signal representative of the voltage 115 across the adaptive-resistance sensor component 110 and the reference value 125, and to output a current vector signal 1075 comprising the increased resolution.

In particular for the illustrated example, the integration circuitry 1040 comprises an integrator 1042, inputs of which are operably coupled to the signal that is representative of the voltage 115 across the adaptive-resistance sensor component 110 and the reference value 125. The integrator 1042 comprises a differential output, which is operably coupled to inputs of a comparator 1044. An output of the comparator 1044 is operably coupled to the up-down counter 1020. A capacitor 1046 is operably coupled across the differential output of the integrator 1042.

The up-down counter 1020 is arranged to set a 'stable' bit 1022 as 'high' when the first comparator loop comprising comparator 230 becomes stable, namely once the voltage 115 across the adaptive-resistance sensor component 110 is subsequently toggling between the two values either side of the reference value 125, and as such is substantially tracking the reference value 125. Once the 'stable' bit 1022 has been set 'high', the up-down counter 1020 is arranged to receive a signal indicating that the integration circuitry 1040 is to be activated, for example in the form of a 'start' bit 1024 being set 'high'. Accordingly, upon the 'start' bit 1024 being set 'high', the up-down counter 1020 sets an end of conversion (eoc) bit 1026 'low', and activates the integration circuitry 1040.

The up-down counter 1020 activates the integration circuitry 1040 by resetting the differential output voltage (Vint) 1048 of the integrator 1042, following which the integrator 1042 integrates the difference between the toggling voltage (Vx) 115 across the adaptive-resistance sensor component 110 and the reference voltage (Vref) 125. The comparator 1044 receives the differential output of the integrator 1042 comprising the integration of the difference between the toggling voltage (Vx) 115 across the adaptive-resistance sensor component 110 and the reference voltage (Vref) 125, and provides an indication to the up-down counter 1020 as to whether the integrated output of the integrator 1042 is 'positive' or 'negative'. Up-down counter 1020 receives the indication from comparator 1044, and adjusts the value of its internal 10-bit counter (output via control signal 170) so as to maintain the differential output voltage (Vint) 1048 of the integrator 1042 at around zero volts. The up-down counter 1020 digitally integrates the adjustments required to the 10-bit counter to maintain the differential output voltage (Vint) 1048 of the integrator 1042 at around zero volts in a 14-bit counter over 16 clock cycles. The 14-bit counter value is then output as an extended resolution output 1075.

After the 16 clock cycle has been completed, and the extended resolution output 1075 has been set to the new 14-bit counter value, the end of conversion (eoc) bit 1026 is set 'high', thereby indicating that the extended resolution output 1075 has been updated. In this manner, the up-down counter 1020 of FIG. 10 is able to increase the resolution of the current measurement from a 10-bit vector to a 14-bit vector.

Figure 11:
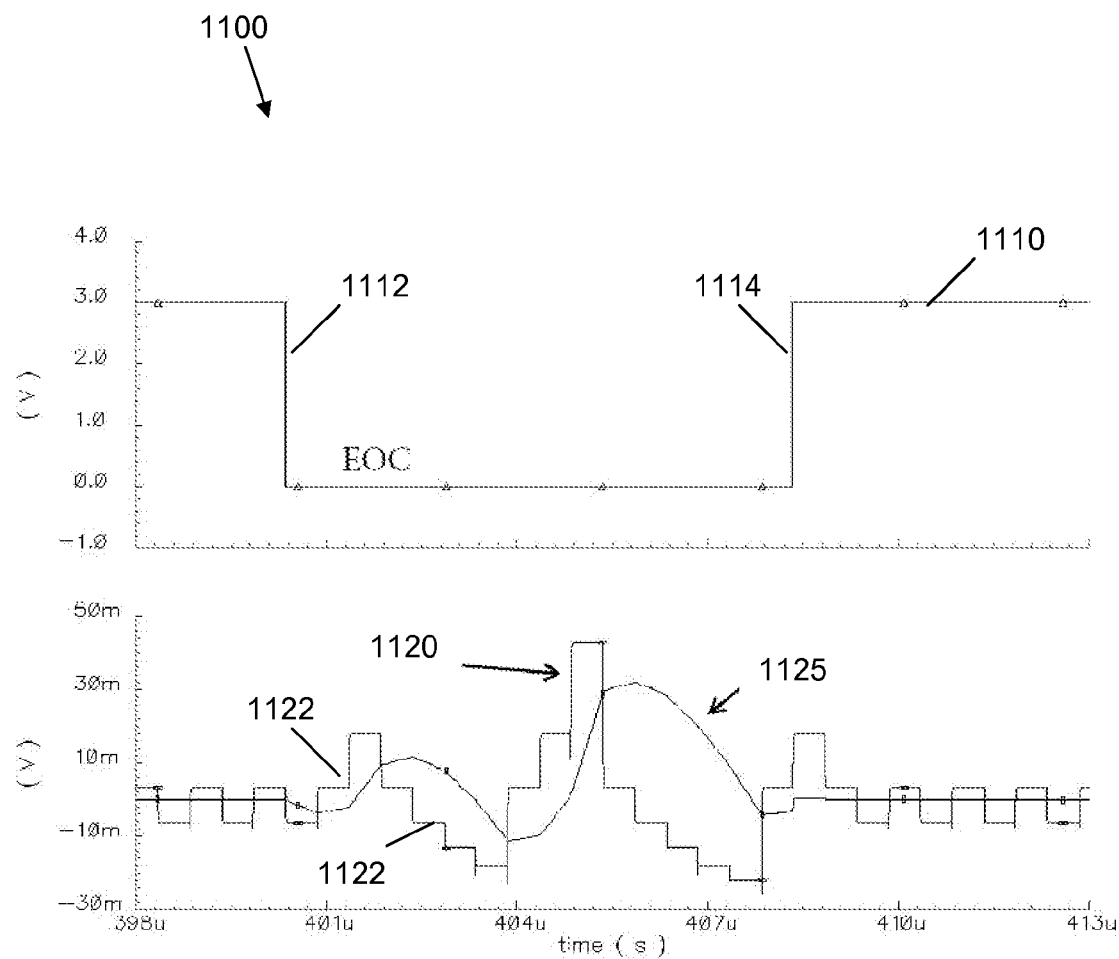
FIG. 11 illustrates an example of a plot for a transient response of the current sensing circuitry of FIG. 10.

FIG. 11 illustrates an example of a plot 1100 for a transient response of the example of the current sensing circuitry illustrated in FIG. 10. The plot 1100 illustrates the end of conversion (eoc) signal 1110, a representation 1120 of an 'input voltage' for the integrator 1042 in a form of a difference between the voltage (Vx) 115 across the adaptive-resistance sensor component 110 and the reference voltage (Vref) 125, and a representation 1125 of the differential output voltage (Vint) 1048 of the integrator 1042. The plot of FIG. 11 starts with the eoc signal 1110 'high', the input voltage 1120 of the integrator toggling just below '0' volts in a stable manner, and the output voltage 1125 being held at around '0' volts. The eoc signal is set to low at 1112, and at substantially the same time the integrator is initialised, thereby causing the output voltage 1125 of the integrator to begin to drop below '0' volts. On each subsequent clock cycle, the up-down counter 1020 adjusts the value of its internal 10-bit counter so as to maintain the differential output voltage (Vint) 1048 of the integrator at around zero volts. Thus, as can be seen in FIG. 11, the adjustments to the 10-bit counter (output via control signal 170) cause the voltage (Vx) 115 across the adaptive-resistance sensor component 110 to increase or decrease. In particular, when the output voltage 1125 of the integrator drops below '0' volts, the voltage (Vx) 115 across the adaptive-resistance sensor component 110 increases due to the adjustment to the 10-bit counter. This, in turn, causes a positive increase in the difference between the voltage (Vx) 115 across the adaptive-resistance sensor component 110 and the reference voltage (Vref) 125, as illustrated at 1122. The integrator integrates this positive difference at the integrator input 1120 into the output signal 1125, which subsequently begins to rise back towards '0' volts. The up-down counter 1020 continues to adjust the 10-bit counter value in order to increase the voltage (Vx) 115 across the adaptive-resistance sensor component 110 until the output signal 1125 returns to (or exceeds) '0' volts. Upon the integrator output signal 1125 exceeding '0' volts, the up-down counter 1020 re-adjusts the 10-bit counter to decrease the voltage (Vx) 115 across the adaptive-resistance sensor component 110, thereby causing the voltage difference at the integrator input 1120 to decrease until it creates a negative difference at the integrator input 1120, as illustrated at 1124. The integrator integrates this negative difference at the integrator input 1120 into the output signal 1125, which subsequently begins to drop back towards '0' volts.

This readjustment of the 10-bit counter and consequential swinging back and forth of the input and output voltages of the integrator continues for 16 clock cycles, at which point the eoc signal 1110 is reset to 'high', as illustrated at 1114. The adjustments that the up-down counter 1020 was required to make during the 16 clock cycles, in order to maintain the output voltage 1125 of the integrator around '0' volts, is digitally integrated with the stable 10-bit counter value into the 14-bit counter, which is output via the extended resolution output 1075 as previously mentioned. The eoc bit 1026 remains 'high', and the extended resolution output 1075 remains unchanged, until the next time the integration circuitry 1040 is initialised. For example, if the up-down counter 1020 detects that the first comparator loop comprising comparator 230 is no longer stable (e.g. the comparator 230 provides the same indication for two consecutive clock cycles), the up-down counter 1020 may instigate the initialisation of the integration circuitry 1040 once the first comparator loop comprising comparator 230 re-stabilises. Alternatively, the up-down counter 1020 may instigate the initialisation of the integration circuitry 1040 upon receipt of a reset signal 1028.

As can be seen from the plot of FIG. 11, the step size at the input of the integrator is not necessarily linear. This creates an error in the digital estimation. The exact value for this error may be given by the harmonic average rather than the mean average. The integrator output voltage Vo after M clock cycles may be represented by:

$$Vo = \sum_{k=1}^{M} (Vref - Vx_k) = 0 \ldots \quad [12]$$

$$\Rightarrow M \cdot Vref = \sum_{k=1}^{M} (Vx_k) \ldots \quad [13]$$

$$\Rightarrow M \cdot \frac{Io}{N_x \cdot Y_{LSB}} = \sum_{k=1}^{M} \frac{Io}{N_k \cdot Y_{LSB}} \ldots \quad [14]$$

$$\Rightarrow N_x = \frac{1}{M} \cdot \frac{1}{\frac{\sum_{k=1}^{M} \frac{1}{N_k}}{M}} \ldots \quad [15]$$

A simulation provided a harmonic average of 85d. This corresponds to a current of (85/16) mA=5.312 mA, giving an error of 0.2%. The computation of the harmonic average may be simplified by accumulating separately the numerator and the denominator of Nx with the following relationships:

$$N_{k+1} = N_k \cdot x_k \quad [16]$$

$$D_{k+1} = D_k \cdot x_k + N_k \quad [17]$$

with the initial values $N_0=1$ and $D_0=0$. $x_k$ is the counter value at the $k^{th}$ clock cycle. At the end of the conversion, the result is given by N divided by D.

Figure 12:
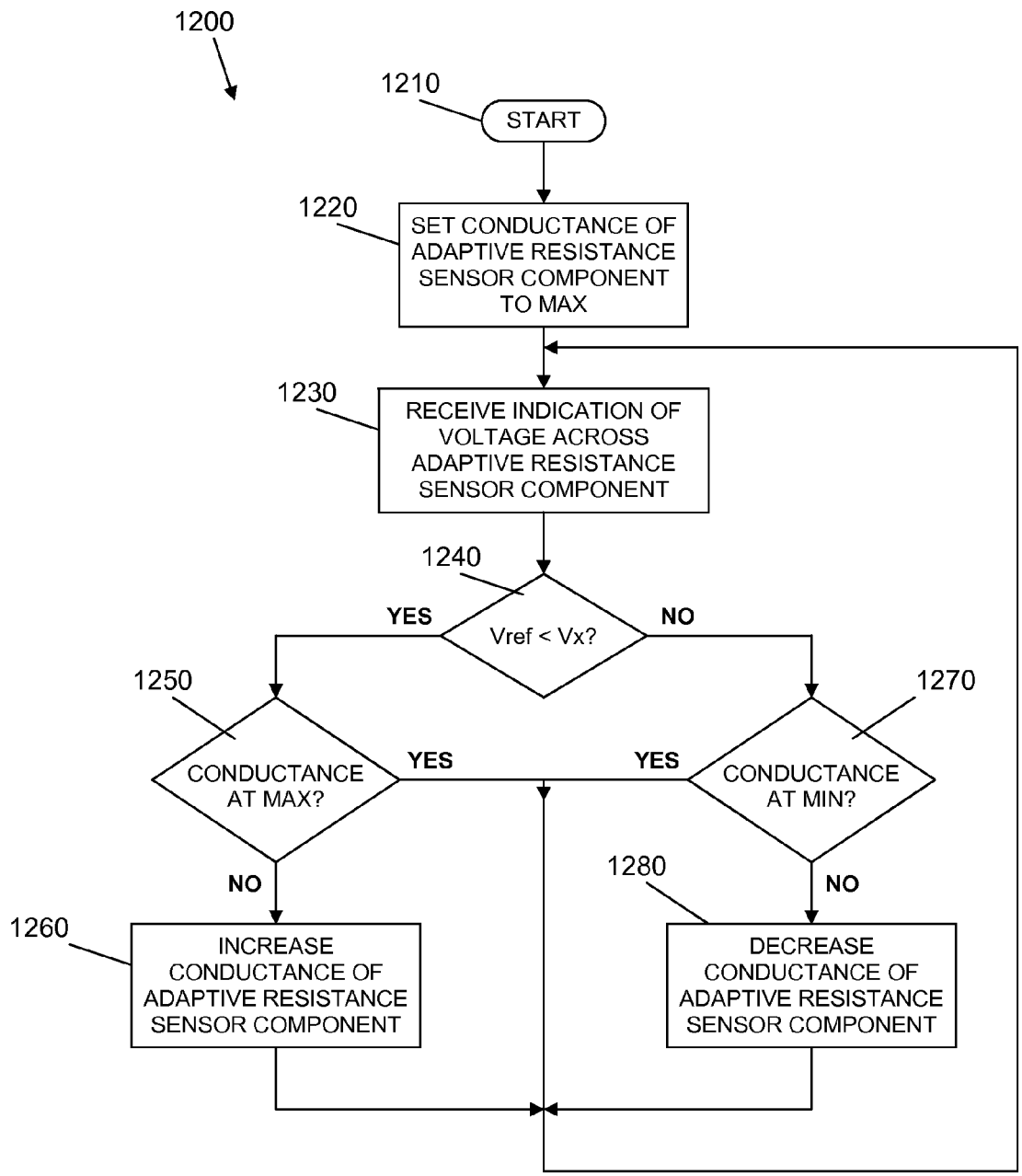
FIG. 12 illustrates an example of a simplified flowchart of a method for sensing a current through a load.

Referring now to FIG. 12, there is illustrated an example of a simplified flowchart 1200 of a method for sensing a current through a load. The method starts at step 1210, for example with the activation of current sensing circuitry, and moves to step 1220 where the resistance of an adaptive-resistance sensor component that is operably coupled in series with the load is set to substantially its minimum value. Next, in step 1230, a signal representative of a voltage (Vx) across the adaptive-resistance sensor component is received. The received signal that is representative of a voltage (Vx) across the adaptive-resistance sensor component is then compared to a reference value (Vref), in step 1240. The resistance of the adaptive-resistance sensor component is then controlled, based on the comparison of the received signal to the reference value, such that the voltage across the adaptive-resistance sensor component substantially tracks a determined voltage value.

In particular for the illustrated example, if the voltage (Vx) across the adaptive-resistance sensor component is less than a reference value (Vref), the method moves on to step 1250, where it is determined whether the resistance of the adaptive-resistance sensor component is at its minimum. If the resistance value of the adaptive-resistance sensor component is at its minimum, the method loops back to step 1230. However, if the resistance of the adaptive-resistance sensor component is not at its minimum, the method moves on to step 1260, where the resistance of the adaptive-resistance sensor component is decreased. The method then loops back to step 1230. Referring back to step 1240, if the voltage (Vx) across the adaptive-resistance sensor component is not less than a reference value (Vref), the method moves on to step 1270, where it is determined whether the resistance of the adaptive-resistance sensor component is at its maximum. If the resistance value of the adaptive-resistance sensor component is at its maximum, the method loops back to step 1230. However, if the resistance of the adaptive-resistance sensor component is not at its maximum, the method moves on to step 1280, where the resistance of the adaptive-resistance sensor component is increased. The method then loops back to step 1230.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate examples, those signals described as positive logic signals may be implemented as negative logic signals, and those signals described as negative logic signals may be implemented as positive logic signals.

Because the apparatus implementing the invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative examples may include multiple instances of a particular operation, and the order of operations may be altered in various other examples.

Also, the examples herein described are not limited to physical devices or units implemented in non-programmable hardware, for example components of the control logic 120, such as up-down counter 220 or up-down counter 1020, but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. Current sensing circuitry for sensing a current through a load, the current sensing circuitry comprising:
    an adaptive-resistance sensor component operably coupled in series with the load; and
    control logic for controlling a resistance of the adaptive-resistance sensor component, wherein the control logic is arranged to:
        receive a voltage signal across the adaptive-resistance sensor component,
        compare the received voltage signal to a determined reference value; and
        in response to the comparison, control the resistance of the adaptive-resistance sensor component, such that the voltage signal across the adaptive-resistance sensor component substantially tracks the determined reference value, wherein the control logic comprises:
            an up-down counter, having as an output a control signal arranged to control the resistance of the adaptive-resistance sensor component, wherein the current sensing circuitry further comprises current regulation circuitry arranged to receive the control signal output by the up-down counter, and the up-down counter further being arranged to count in a first direction if the received voltage signal is greater than the determined reference value; and count in a second direction opposite to the first direction if the received voltage signal is less than the determined reference value; and
            comparator logic arranged to compare the received voltage signal to the determined reference value and to provide an indication to the up-down counter as to whether the received voltage signal is less than or greater than the determined reference value, wherein the comparator logic comprises:

a synchronous comparator arranged to perform the comparison of the received voltage signal to the determined reference value and to provide an indication to the up-down counter as to whether the received voltage signal is less than or greater than the determined reference value on one of a positive edge or a negative edge of a clock signal; and the up-down counter is further arranged to count up or count down, depending on the received indication on the other of the positive edge or negative edge of the clock signal.

2. The current sensing circuitry of claim 1 wherein the adaptive-resistance sensor component comprises an array of low voltage (LV) binary weighted transistors.

3. The current sensing circuitry of claim 1 wherein the up-down counter is further arranged to:
increment the control signal if the received voltage signal is greater than the determined reference value; and
decrement the control signal if the received voltage signal is less than the determined reference value.

4. The current sensing circuitry of claim 1 wherein the up-down counter is arranged to use an adaptive step size.

5. The current sensing circuitry of claim 1 wherein the control logic further comprises:
integration circuitry arranged to integrate a difference between the received voltage signal and the determined reference value;
the up-down counter further arranged, in response to the voltage signal across the adaptive-resistance sensor component is substantially tracking the determined reference value, to:
initialise the integration circuitry such that the integration circuitry provides the up-down counter with an increased resolution for the difference between the received voltage signal and the determined reference value; and
output a current vector signal comprising the increased resolution.

6. The current sensing circuitry of claim 1 wherein the sensing circuitry further comprises reference circuitry for generating a reference voltage for use as the determined reference value.

7. The current sensing circuitry of claim 6 wherein the reference circuitry comprises:
a reference transistor; and
at least one charge pump operably coupled to the reference transistor, wherein
current from the at least one charge pump flows through the reference transistor, and
an internal resistance of the reference transistor causes a voltage drop across the reference transistor, said voltage drop across the reference transistor providing the reference voltage for use as the determined reference value.

8. The current sensing circuitry of claim 7 wherein the reference circuitry comprises:
a first charge pump operably coupled to the reference transistor and at least one further charge pump, the at least one further charge pump being selectively coupled to the reference transistor.

9. The current sensing circuitry of claim 1 wherein the current sensing circuitry further comprises gain error compensation logic operably coupled between the control logic and current regulation circuitry.

10. The current sensing circuitry of claim 1 wherein, upon initialisation, the control logic arranged to turn the adaptive-resistance sensor component fully on such that the resistance of the adaptive-resistance sensor component is low.

11. The current sensing circuitry of claim 1 wherein the adaptive-resistance sensor component is operably coupled in series with the load between a power transistor and a ground plane.

12. A method for sensing a current through a load, the method comprising:
receiving a voltage signal across an adaptive-resistance sensor component operably coupled in series with the load;
comparing the received voltage signal to a determined reference value;
providing an indication as to whether the received voltage signal is less than or greater than the determined reference value on one of a positive edge or a negative edge of a clock signal;
counting in a first direction if the received voltage signal is greater than the determined reference value; and
counting in a second direction opposite to the first direction if the received voltage signal is less than the determined reference value, wherein the counting in the first direction and the counting in the second direction depend on the indication on the other of the positive edge or the negative edge of the clock signal;
outputting a control signal arranged to control the resistance of the adaptive-resistance sensor component; and
controlling the resistance of the adaptive-resistance sensor component, based on said comparing, such that the voltage signal across the adaptive-resistance sensor component substantially tracks the determined reference value, wherein the control logic comprises an up-down counter, having as an output a control signal arranged to control the resistance of the adaptive-resistance sensor component, and the up-down counter further being arranged to count in a first direction if the received voltage signal is greater than the determined reference value and count in a second direction opposite to the first direction if the received voltage signal is less than the determined reference value, the control logic further comprising comparator logic arranged to compare the received voltage signal to the determined reference value and to provide an indication to the up-down counter as to whether the received voltage signal is less than or greater than the determined reference value, wherein the comparator logic comprises a synchronous comparator arranged to perform the comparison of the received voltage signal to the determined reference value and to provide an indication to the up-down counter as to whether the received voltage signal is less than or greater than the determined reference value on one of a positive edge or a negative edge of a clock signal and the up-down counter is further arranged to count up or count down, depending on the received indication on the other of the positive edge or negative edge of the clock signal.

13. The method of claim 12 wherein said controlling the resistance of the adaptive-resistance sensor component further comprises:
providing a control signal that is incremented if the received voltage signal is greater than the determined reference value; and
providing the control signal that is decremented if the received voltage signal is less than the determined reference value, wherein
the control signal is provided by an up-down counter.

14. The method of claim 13 further comprising:
providing an indication to the up-down counter regarding whether the received voltage signal is less than or greater than the determined reference value.

15. The method of claim 12 further comprising:
generating a reference voltage for use as the reference value.

16. An integrated circuit comprising:
current sensing circuitry for sensing a current through a load, the current sensing circuitry comprising:
    an adaptive-resistance sensor component arranged to be operably coupled in series with the load, and
    control logic for controlling a resistance of the adaptive-resistance sensor component, the control logic arranged to:
        receive a voltage signal across the adaptive-resistance sensor component,
        compare the received voltage signal to a determined reference value; and;
        in response to the comparison, control the resistance of the adaptive-resistance sensor component, such that the voltage across the adaptive-resistance sensor component substantially tracks the determined voltage value, wherein the control logic comprises:
            an up-down counter, having as an output a control signal arranged to control the resistance of the adaptive-resistance sensor component, wherein the current sensing circuitry further comprises current regulation circuitry arranged to receive the control signal output by the up-down counter, and the up-down counter further being arranged to count in a first direction if the received voltage signal is greater than the determined reference value and count in a second direction opposite to the first direction if the received voltage signal is less than the determined reference value; and
            comparator logic arranged to compare the received voltage signal to the determined reference value and to provide an indication to the up-down counter as to whether the received voltage signal is less than or greater than the determined reference value, wherein the comparator logic comprises:
                a synchronous comparator arranged to perform the comparison of the received voltage signal to the determined reference value and to provide an indication to the up-down counter as to whether the received voltage signal is less than or greater than the determined reference value on one of a positive edge or a negative edge of a clock signal; and
                the up-down counter is further arranged to count up or count down, depending on the received indication on the other of the positive edge or negative edge of the clock signal.

17. Current sensing circuitry for sensing a current through a load, the current sensing circuitry comprising:
    an adaptive-resistance sensor component operably coupled in series with the load; and
    control logic for controlling a resistance of the adaptive-resistance sensor component, wherein the control logic is arranged to:
        receive a voltage signal across the adaptive-resistance sensor component,
        compare the received voltage signal to a determined reference value; and
        in response to the comparison, control the resistance of the adaptive-resistance sensor component, such that the voltage signal across the adaptive-resistance sensor component substantially tracks the determined reference value, wherein the control logic comprises:
            an up-down counter, having as an output a control signal arranged to control the resistance of the adaptive-resistance sensor component, and the up-down counter further being arranged to:
                count in a first direction if the received voltage signal is greater than the determined reference value; and
                count in a second direction opposite to the first direction if the received voltage signal is less than the determined reference value; and
            comparator logic arranged to compare the received voltage signal to the determined reference value and to provide an indication to the up-down counter as to whether the received voltage signal is less than or greater than the determined reference value, wherein the comparator logic comprises:
                a synchronous comparator arranged to perform the comparison of the received voltage signal to the determined reference value and to provide an indication to the up-down counter as to whether the received voltage signal is less than or greater than the determined reference value on one of a positive edge or a negative edge of a clock signal; and
                the up-down counter is further arranged to count up or count down, depending on the received indication on the other of the positive edge or negative edge of the clock signal.

\* \* \* \* \*